Oct. 10, 1933.  C. J. BROWN  1,929,836
BEARING
Filed Sept. 10, 1929    2 Sheets-Sheet 1
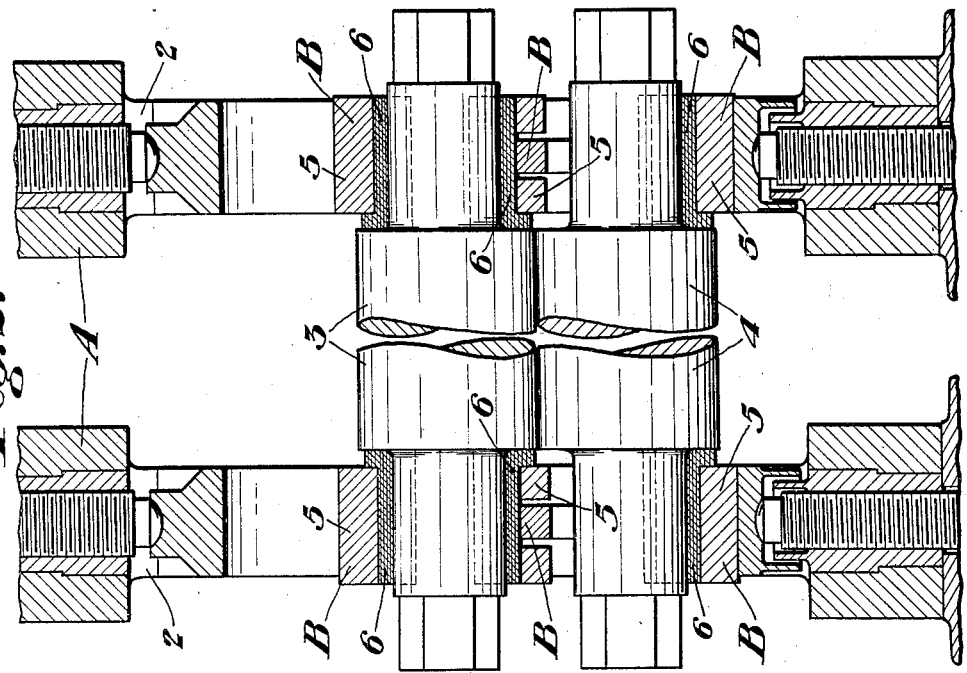
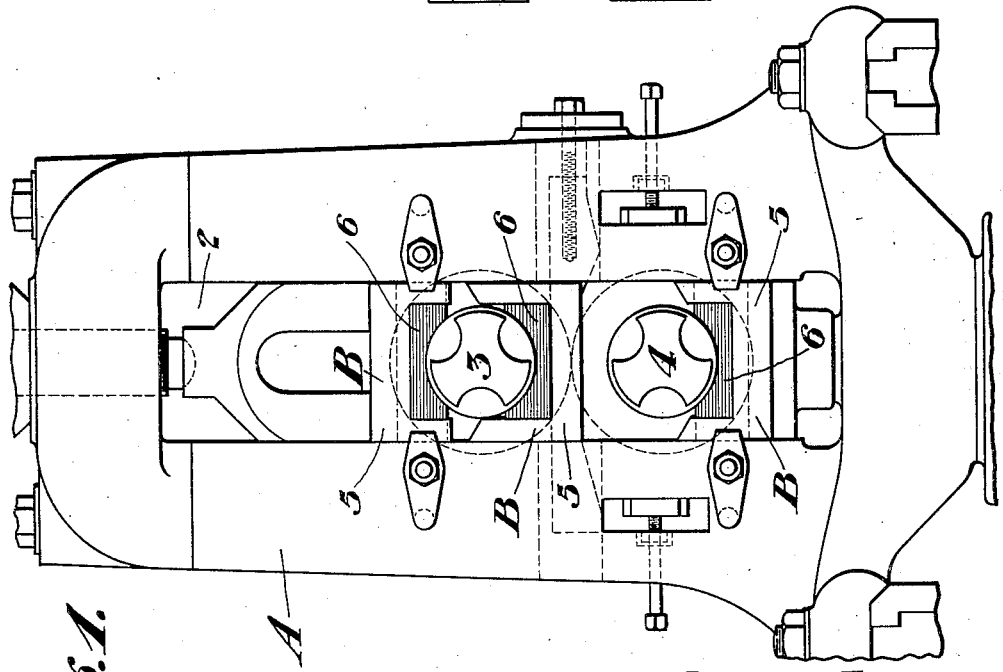
Inventor:
CHARLES J. BROWN,
by: Usina & Rauber
his Attorneys.

Oct. 10, 1933.  C. J. BROWN  1,929,836
BEARING
Filed Sept. 10, 1929   2 Sheets-Sheet 2

Inventor:
CHARLES J. BROWN,
by:
his Attorneys.

Patented Oct. 10, 1933

1,929,836

UNITED STATES PATENT OFFICE 1,929,836

BEARING

Charles J. Brown, Donora, Pa.

Application September 10, 1929
Serial No. 391,545

7 Claims. (Cl. 308—238)

This invention relates to bearings and more particularly to journal bearings, and has for its object the provision of a composition bearing which will have materially less friction than metal bearings and will wear many times longer than metal bearings.

The bearing of this invention is composed of a self-sustaining body composed of laminations of woven fabric, such as canvas, and a binder consisting of a phenolic condensation product, such as bakelite.

In the drawings:

Figure 1 is a side elevation of a roll stand having the bearings of this invention mounted therein.

Figure 2 is a sectional elevation through the stand of rolls.

Figure 3:
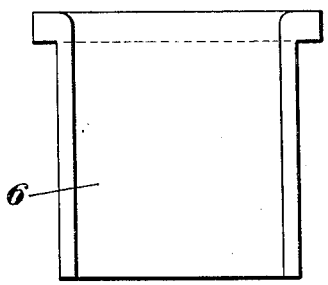
Figure 3 is a plan view of the bearing body.

Referring more particularly to the drawings, the letter A designates the side housings of the roll stand which are of standard design and have the usual windows 2 in which the bearings B supporting the rolls 3 and 4 are mounted.

The upper roll 3 is provided with upper and lower bearings while the lower roll is provided with a bottom bearing only.

The bearings B comprise a metal backing-up block 5 similar to the bearing blocks usually employed to support the brasses of ordinary bearings, and a working or wearing body 6 composed of a composite material consisting of laminations of canvas or other woven fabric and binder, preferably a phenolic condensation product, such as bakelite, which is a condensation product of phenols and formaldehyde.

The body 6 may be composed of a single piece of the composite material or a plurality of pieces mechanically secured together. The material may be molded or machined to shape or may be molded to approximate size and shape and finally finished by machining.

Figure 5:
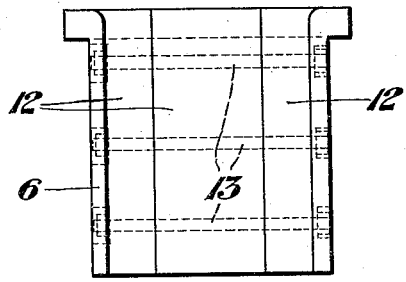
Figure 5 is a plan view of a modified form of bearing body.
Figure 4:
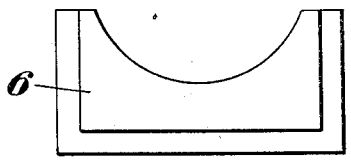
Figure 4 is an end elevation thereof.
Figure 6:
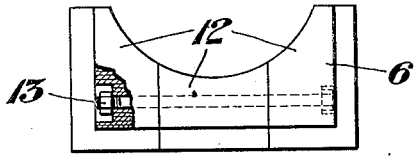
Figure 6 is an end elevation of the bearing body of Figure 5.

In Figures 5 and 6 I have shown a bearing body 6 formed of a plurality of pieces 12 of composite material which are held together to form a bearing unit by means of bolts 13. This modified bearing may be formed of pieces or blocks molded or machined to shape before assembly or the blocks may be first assembled and then machined to shape, as desired.

Figure 7:
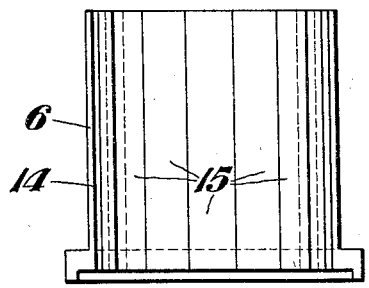
Figure 7 is a plan view of a still further modified form of bearing body.
Figure 9:
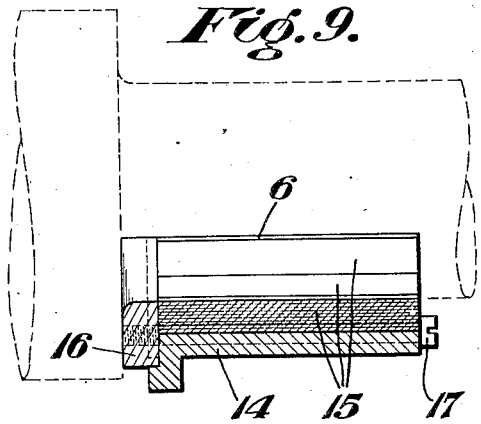
Figure 9 is a sectional view taken on the line IX—IX of Figure 8.
Figure 8:
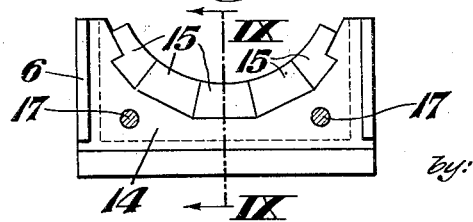
Figure 8 is an end elevation of the bearing body of Figure 7.

In Figures 7 to 9 I have shown a still further modified form of bearing body 6 consisting of a brass or other metal shell 14 having a wearing surface composed of segments 15 of composite material. The thrust face of the shell 14 is recessed to receive a thrust plate 16 of composite material which is held in position by dowels 17.

It will be understood that, if desired, the composite material may be molded and pressed directly to shape in the metal shell on the backing-up block.

The composite material of the bearings may be made by coating the fabric with bakelite or other similar adhesive. The fabric is then dried and the dried sheets are stacked one upon the other with the coated side of each sheet next to the uncoated side of the adjacent sheet until the desired thickness is obtained. The stack of sheets is then pressed between the heated platens of a hydraulic press until the sheets of fabric are firmly cemented together and the fabric is impregnated with the adhesive material. This treatment transforms the composite material into a hard, compact and coherent mass.

The resultant material is insoluble in water, is not affected by heat, and has very low friction.

Experience has shown that bearings constructed as above described may be used without lubrication except that of the water by which the rolls and bearings are cooled. Oil or other lubricants may be used when desired, but, whether lubricants are used or not the bearings will reduce the friction on the mill so that the power consumption is reduced approximately thirty-five per cent. over that necessary when brass or other metal bearings are used. Further experience has shown that where the metal bearings previously used had a life of approximately six turns of eight hours, the new composite bearing of this application has a life of more than eighty turns, so that a very material saving in the cost of the bearings is also had.

Other advantages, such as increased production of the mills, less attention required to keep the rolls in adjustment due to less wear of the bearings, improved quality of product due to the rolls remaining in more perfect adjustment, and generally improved operating conditions all result from the use of the novel bearing of this application.

While I have shown and described my novel bearing as applied to a stand of rolling mill rolls, it will be understood that I do not wish to be limited to this use since it may be used wherever a journal bearing is desired having long life and low friction loss. It will also be understood that I do not wish to be limited to the specific constructions shown and described nor to the method of manufacture described since various constructions may be made and various methods of manufacture employed without departing from the scope of my invention, as defined in the appended claims.

I claim:

1. A heavy-duty bearing comprising a strong unitary body consolidated from laminated fibrous sheets impregnated with heat-hardening resinoid to form a relatively hard, resilient, smooth bearing surface, the wearing face of said bearing being of open, concave structure.

2. A heavy-duty journal bearing comprising a strong, unitary body consolidated from laminated fibrous sheets impregnated with heat-hardening resinoid to form a relatively hard, resilient, smooth bearing surface, the wearing face of said bearing being of open, cylindrical structure, and in combination therewith a supporting backing-up block partially encasing said bearing body and having faces parallel to the journal axis, the bearing body fitting into the backing-up block with a smooth surface intersecting said block faces, and having radial edge faces also intersecting said block faces.

3. A heavy-duty journal bearing comprising a bearing body having an open cylindrical wearing face, and in combination a thrust plate secured at one end of said bearing body and composed of a strong, unitary body consolidated from laminated fibrous sheets impregnated with heat-hardening resinoid to form a relatively hard, resilient, smooth thrust face.

4. A heavy-duty journal bearing comprising a strong, unitary body consolidated from laminated sheets impregnated with heat-hardening resinoid to form a relatively hard, resilient, smooth bearing surface, the wearing face of said bearing being of open cylindrical structure, and in combination a thrust plate secured at one end of the bearing body and composed of a strong unitary body consolidated from laminated sheets impregnated with heat-hardening resinoid to form a relatively hard, resilient, smooth thrust face.

5. A heavy-duty open-face concave bearing comprising a strong, unitary body consolidated from laminated woven fabric unfelted sheets impregnated with heat-hardening resinoid to form a relatively hard, resilient, smooth bearing surface.

6. A heavy-duty journal bearing comprising a strong unitary body consolidated from laminated woven fabric sheets impregnated with heat-hardening resinoid to form a relatively hard, resilient smooth bearing surface, the wearing face of said bearing being of open cylindrical structure and in combination therewith a supporting backing-up block partially encasing said bearing body and having faces parallel to the journal axis, the bearing body fitting into the backing-up block with a smooth surface intersecting said block faces, and having radial edge faces also intersecting said block faces.

7. A heavy-duty journal bearing comprising a bearing body having an open cylindrical wearing face and in combination a thrust plate removably secured at one end of said bearing body, said bearing body and thrust plate being composed of a strong, unitary body consolidated from laminated woven fabric sheets impregnated with heat-hardening resinoid to form a relatively hard, reslient, smooth surface structure.

CHARLES J. BROWN.